UNITED STATES PATENT OFFICE.

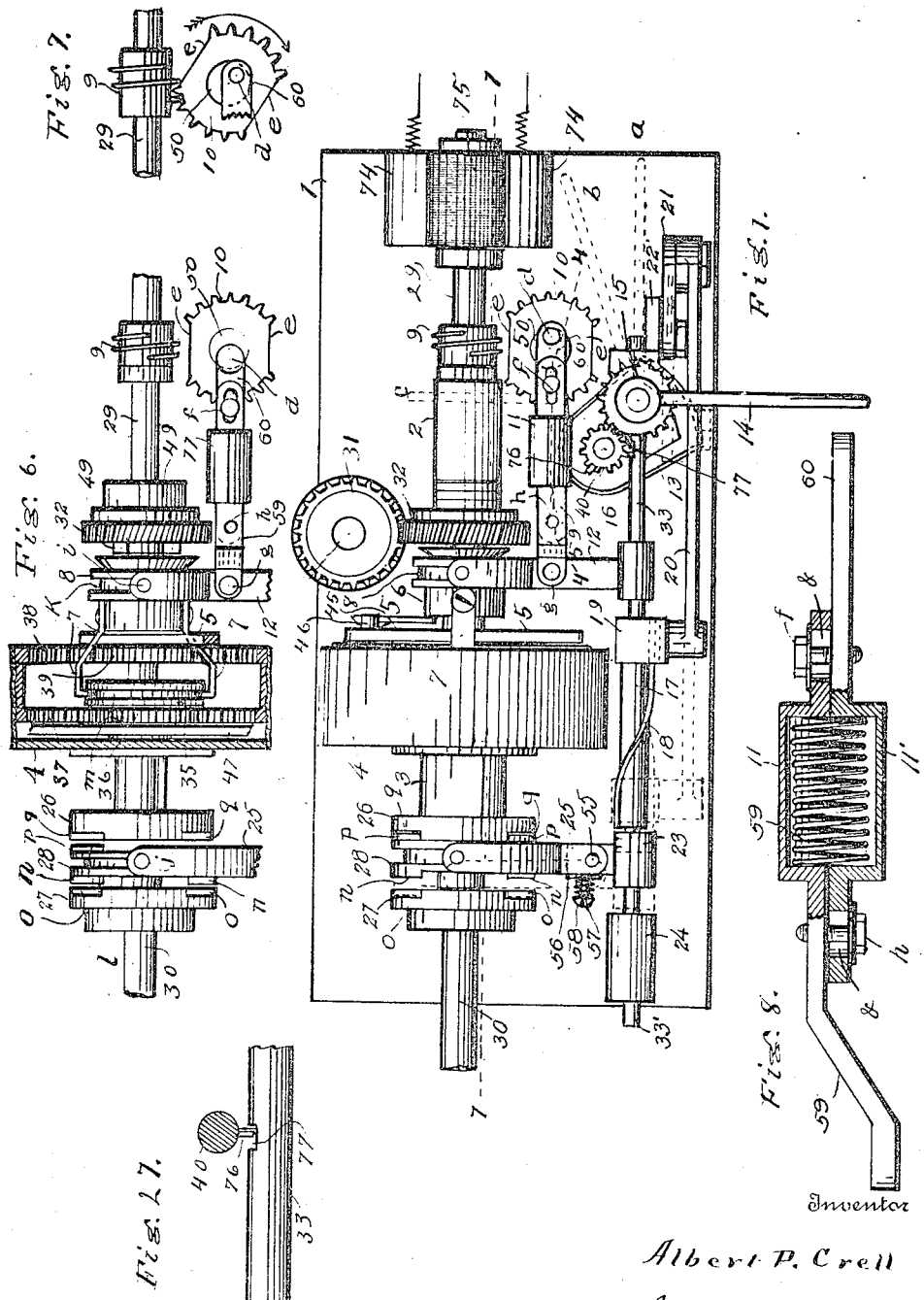

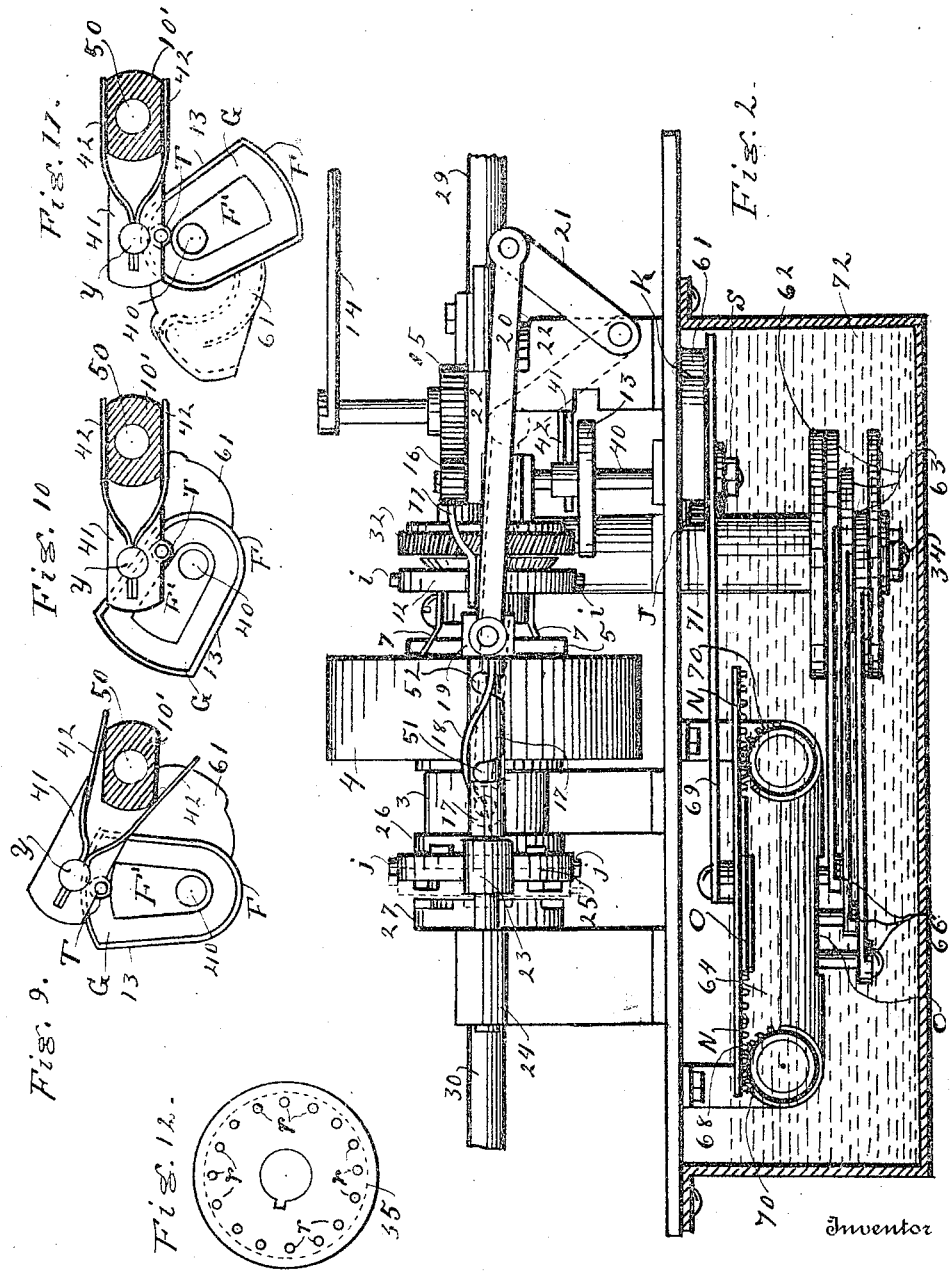

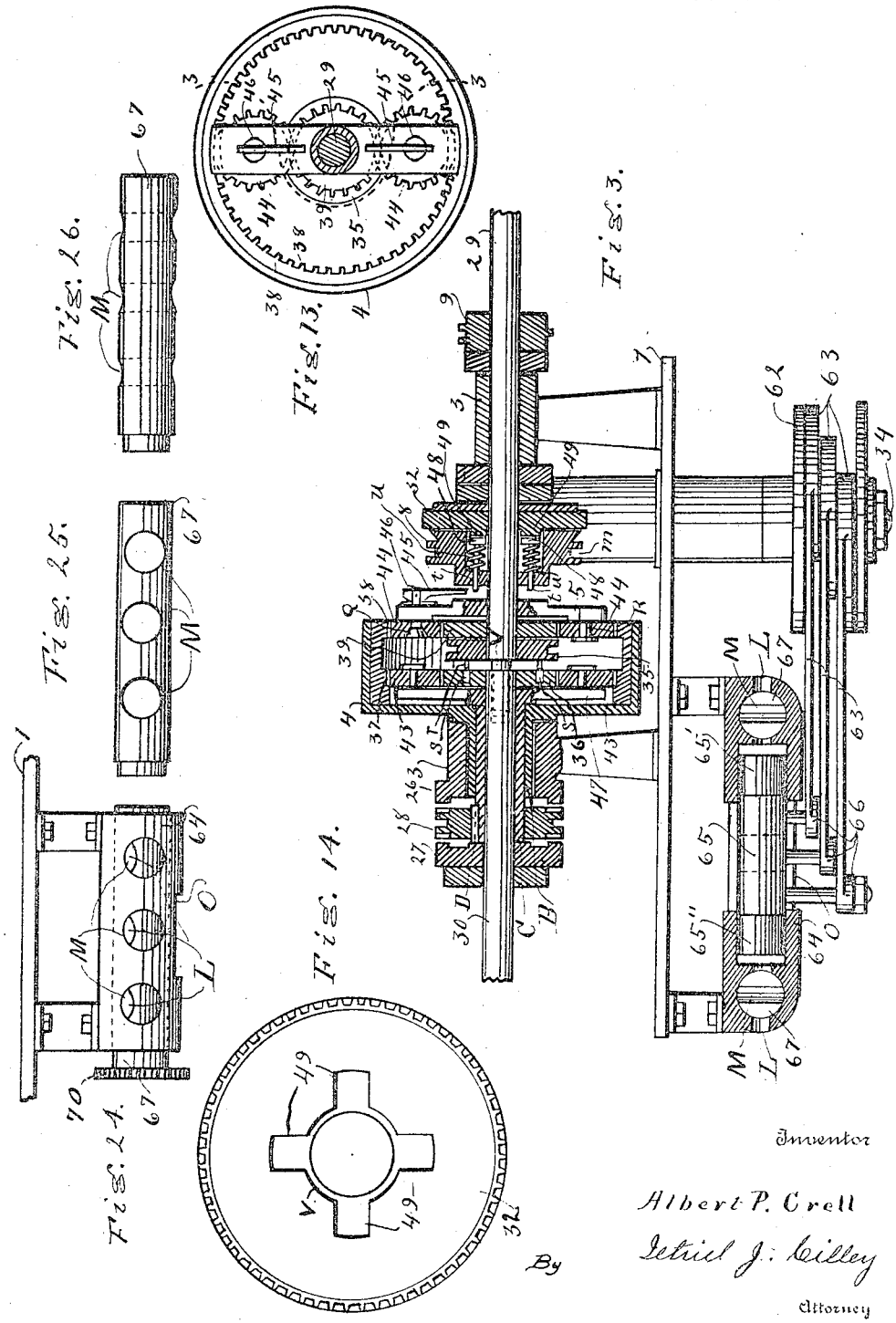

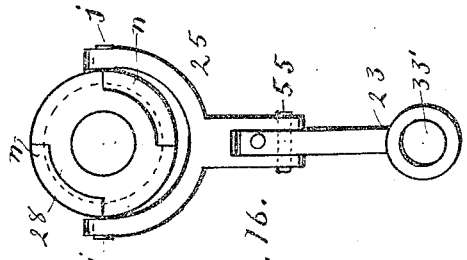
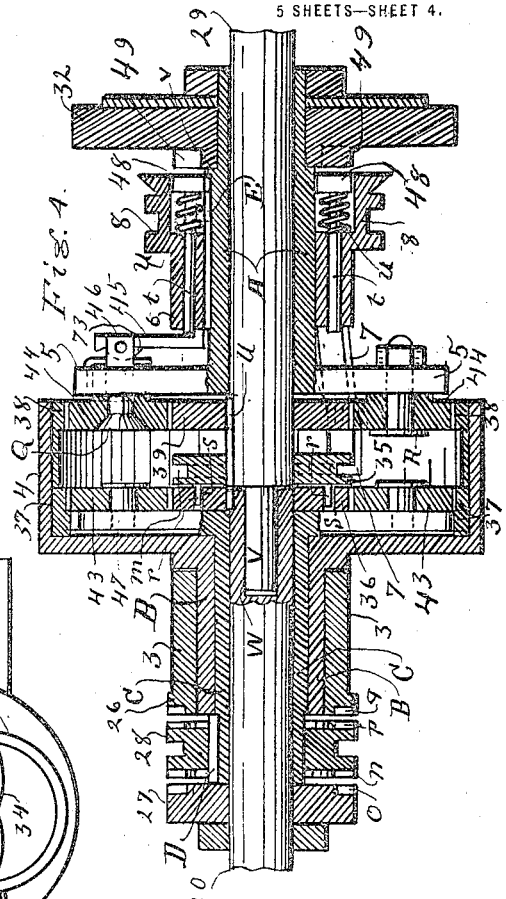

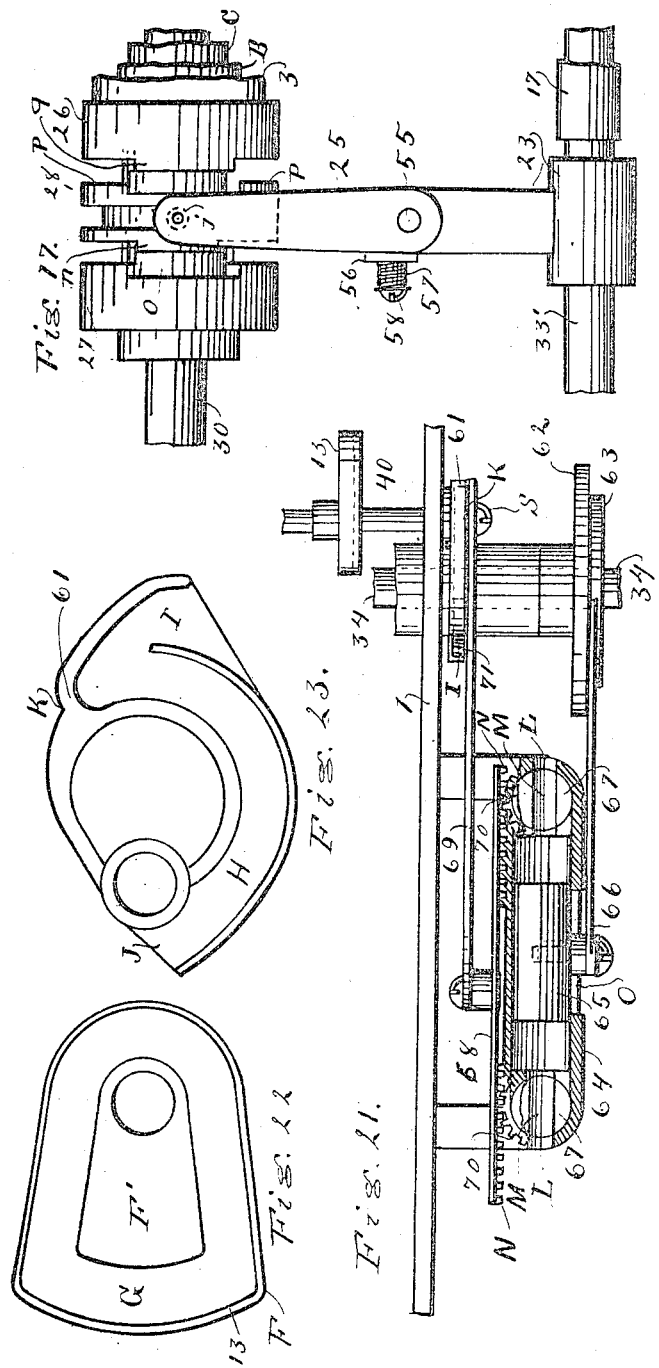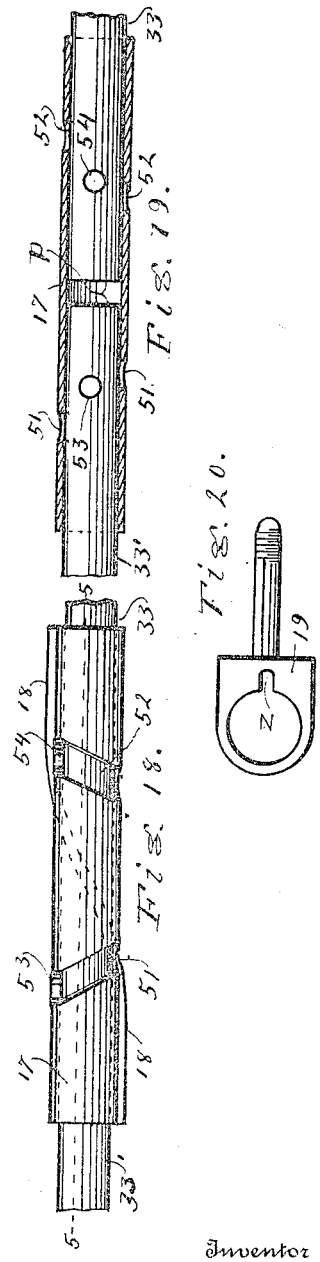

ALBERT P. CRELL, OF GRAND RAPIDS, MICHIGAN.

POWER TRANSMISSION.

1,288,525.   Specification of Letters Patent.   Patented Dec. 24, 1918.

Application filed September 23, 1916. Serial No. 121,894.

*To all whom it may concern:*

Be it known that I, ALBERT P. CRELL, a citizen of the United States, residing at Grand Rapids, in the county of Kent and State of Michigan, have invented certain new and useful Improvements in Power Transmissions, of which the following is a specification.

My invention relates to improvements in transmission mechanism for use on automobiles, and its objects are: First, to provide a means whereby the clutch used on ordinary transmission may be dispensed with; second, to provide a transmission that may be shifted from fast to slow, from slow to fast, or may be reversed without jar, without additional strain upon the gear wheels, and without danger of stripping the teeth from gear wheels when reversing, or increasing the speed of an automobile, and, third, to provide a transmission that will not grate, rumble, or produce other unpleasant sounds when changing from one motion to another or when reversing.

I attain these objects by the mechanism illustrated in the accompanying drawing, in which Figure 1 is a plan of the transmission mechanism with a motor connected to the main shaft; Fig. 2 is an elevation of the device showing the hydraulic governor, and a section of an oil tank for operating the governor; Fig. 3 is a vertical section of the same on the line 1—1 of Fig. 1 and of the governor on the line 2—2 of Fig. 5; Fig. 4 is a longitudinal section of the transmission on line 1—1 of Fig. 1 showing the clutch set for direct "fast"; Fig. 5 is a bottom plan of the governor; Fig. 6 is a plan of the main transmission shafts and gearing, with the main gear in section on the line 3—3 of Fig. 13 to show the relative positions of the several gears and clutches therein; Fig. 7 is a plan of the end of the driving shaft showing the shifting mechanism just entering operative contact; Fig. 8 is a longitudinal section of the adjusting chamber in the connecting rod, on the line 4—4 of Fig. 1; Figs. 9, 10 and 11 are plan views of the cam that actuates the shifting mechanism and the governor, with the hub of the worm gear shown in cross section to disclose its flattened surfaces; Fig. 12 is a face view of an available form of clutch for use on the adjacent ends of the driving shaft and the driven shaft to connect and disconnect them so the main shaft may be used either as a single shaft or as a shaft divided to form a disengaged driving shaft and driven shaft; Fig. 13 is a front elevation of the main gear drum showing the relative positions of the intermediate gear by means of which a slower movement may be transmitted from the driving shaft to the driven shaft; Fig. 14 is a like view of the spiral gear on the driving shaft from which motion and power is transmitted from the main shaft to the governor pistons; Fig. 15 is a like view of the sliding member of the clutch that operates the spiral gear of the main shaft; Fig. 16 is a side view of the sliding member of the reversing clutch and its actuating arm; Fig. 17 is a plan of the same in connection with the permanent members of said clutch; Fig. 18 is a plan, and Fig. 19 is a longitudinal section, on the line 5—5 of Fig. 18, of the sleeve that actuates the reversing clutch; Fig. 20 is a side view of the arm that actuates the sleeve that is shown in Figs. 18, 19; Fig. 21 is a sectional view, on the line 2—2 of Fig. 5 of the governor, with its operating mechanism connected; Fig. 22 is a plan of the main cam; Fig. 23 is a bottom plan of the governor operating cam; Fig. 24 is an end elevation of the governor showing the valve partly closed as for slow speed; Fig. 25 is an elevation of the valve detached and in open position so that if within its bearing in the governor, liquid would pass freely out of the governor cylinders without having any effect upon the governor to slacken or control the speed of the driven shaft; Fig. 26 is the same shown in position, if in its bearings, to cut off the flow of liquid from the governor barrels and thus hold the gear bearing arms on the driving shaft in position to run the transmission in temporary fast speed. Fig. 27 is a plan of a short piece of the sliding shaft and a cross sectional view of the cam shaft showing a trip device for governing the movement of the actuating lever.

Similar reference characters refer to similar parts throughout the several views and on the several sheets of drawings.

In the construction of this transmission the main shaft is divided within the main gear drum 4, as indicated in Figs. 3 and 4 to form a driving shaft 29, and a driven shaft 30. For the purpose of holding this divided shaft in perfect alinement when in operative position, I form a tenon V on the end of the shaft 29, and a corresponding hole W, in the adjacent end of the shaft 30 so as to form a long, strong, and easily adjustable connection between the shafts and still leave them so each shaft may revolve independently of the other.

I key a gear wheel 39 securely to the shaft 29, near the inner end thereof, and a corresponding gear wheel 36 securely to the end of the shaft 30 so each of said gears must revolve with its respective shaft. I then place oppositely disposed arms 5, preferably made integral with a sleeve A long enough to pass through the shifter wheel 8 and the gear 32 upon the shaft 29 in such a manner that the shaft may revolve freely within the sleeve. I, also, place oppositely disposed arms, 47, upon the shaft 30. These arms should be made integral with a sleeve C, made long enough to extend through the bearing 3, and the clutch members 26 and 28 and to the face of the clutch member 27, and be so arranged that the shaft 30 may revolve freely in said sleeve. I then place a main gear casing or drum 4, having an integral sleeve B that extends through the bearing 3 and to the outer surface of the clutch member 26, which, by the way, may be made integral with the bearing 3, in such a manner that it may revolve independently of the sleeve C, or in the opposite direction if necessary. This drum is provided with two sets of internal gear teeth, 37, and 38, as indicated in Figs. 3, 4 and 6, which extend around the entire inner periphery of the drum.

The arms 5 are designed to carry intermediate gears or idlers, 44, which are mounted on bearings Q and R in such a manner that when the shaft 29 is made to revolve the gear wheels 44 will be carried freely within the gear wheel 39 and will be made to revolve thereby and, meshing with the gear teeth 38, will, normally, revolve freely around inside of the drum 4 while said drum is standing idle, but may, under certain conditions to be hereinafter fully explained, cause the drum to revolve in the opposite direction from the way the shaft 29 is revolving.

I, also, place intermediate gear wheels, 43, upon the arms 47, in such a manner that with a proper manipulation of the clutch member 28, to be hereinafter more fully described, they may be made to cause the shaft 30 to revolve in the same direction with, or in the opposite from the shaft 29, as desired, it being understood that the gear wheels 43 mesh freely with the gear wheel 36 and with the gear teeth 37.

Normally, when the shaft 29 is made to revolve the arms 5 and the gear wheels 44 revolve freely with it without having any effect upon the gear drum 4. To make the gear wheels 44 cause the drum 4 to revolve, it is necessary to provide some form of governor mechanism that will retard the arm 5 when the shaft 29 is revolving, so that the revolving of the gear wheel 39 with the shaft 29 will cause the gear wheels 44 to revolve the drum 4. For this purpose I mount a spiral gear wheel 32 loosely upon the shaft 29, or, better, upon the sleeve A when used. This gear wheel has lugs 49 formed on one side, which are designed to force back the plates 48 and enter the openings in the shifting member 8, occupied by the plates 48, and form a clutch connection between the member 8 and the gear wheel 32. The shifting member 8 is held in slidable condition upon the shaft 29, or, rather, upon the sleeve A, and is made to revolve with said sleeve, by means of a sliding key, E, so that when the clutch members 49 pass where the plates 48 are located, the spiral gear wheel 32 will be made to revolve with the shaft 29 and the sleeve A, and the integral arms 5. The spiral gear wheel 32 meshes with the like gear 31, which, in turn, is mounted on the vertical shaft 34 and causes said shaft to revolve. The shaft 34 extends downward through the table 1 and has an eccentric, as 62, firmly mounted at its lower end. This eccentric, or eccentrics, as the case may be, is, or are connected with the pistons 65, as at 66, by eccentric rods 63. The pistons 65 are made to reciprocate in the governor cylinders 64 by the revoluble movement of the shaft 34. The governor cylinders 64 are immersed in a tank of soft, flexible oil, as 72 and are provided with openings O for the free entrance of oil into the cylinders, and with an opening L at each end of each cylinder for the free passage of oil out of the cylinder when these openings are in proper condition. 65, 65' and 65", in Fig. 3, represent the three several positions of the pistons in a three cylinder governor, the piston 65 being so located as to wholly close the opening O, while the other two pistons are so positioned that oil may enter their respective cylinders at one end or the other, as their positions indicate. These pistons are made to reciprocate in the cylinders by the rotary movement of the shaft 34, as hereinbefore indicated, through the medium of eccentrics 62 and the eccentric rods 63.

To make these governors operative to cause the drum 4 to revolve when the shaft 29 is revolving, it is necessary to cut off the flow of oil at the ends of the cylinders 64, and for this purpose I place an oscillating, or revoluble valve, 67, laterally through each end of the governor case, as shown in Figs. 3 and 24. These valves are provided with a port, or opening, as M, at the end of each cylinder. These ports, normally, stand open, as indicated in Fig. 25, and the governor will have no effect upon the transmission mechanism.

If it is desired to run the transmission upon "fast" the valve 67 is turned to practically the position indicated in Figs. 3 and 26 when the opening L—M will be closed, as shown in Fig. 3, and no oil can be forced therethrough. This will hold the pistons 65 firmly in position in the cylinders and the shaft 34 and the worm gears 31 and 32 will be thereby prevented from revolving and thus the arms 5 will be held rigidly in one position, and by this means, with the shaft 29 revolving at normal speed, the action of the gear wheel 39, which is securely connected with the shaft 29, upon the intermediate gear wheels 44, and their action upon the gear teeth 38 will cause the drum 4 to revolve at a greater speed in the opposite direction from that in which the shaft 29 is revolving. If it is desired to vary the speed of the revolving drum 4 this may be done by varying the position of the valves 67 between that shown in Fig. 25 and that shown in Fig. 26, as indicated in Fig. 24, when the pressure necessary to force the oil out through the opening will regulate the speed of the drum 4 according to the size of the opening. When the drum 4 is made to revolve under these conditions, its action upon the intermediate gear wheels 43 will cause the gear wheel 36, and the shaft 30, to revolve in the same direction that the shaft 29 is revolving, but much slower, or, in common parlance, placing the transmission in "slow".

To bring about the results hereinbefore last mentioned, the clutch member 28 must be made to engage the clutch member 26 by causing the lugs $p$ and $q$ to interlock. This clutch member being integral with the bearing member 3, it will anchor the clutch member 28 firmly, and the clutch member 28 being secured to the sleeve C so it cannot be made to revolve thereon, as by the key D, the sleeve C and the integral arms 47 are held in permanent position while the drum 4 is being made to revolve, as hereinbefore described, and as the gear wheel 36 is permanently secured onto the end of the shaft 30, this shaft will be made to revolve, by the means, and in the manner hereinbefore stated.

I have provided for reversing the revoluble movement of the shaft 30 by carrying the clutch member 28 out of engagement with the clutch member 26, and throwing it into engagement with the clutch member 27 by interlocking the lugs $n$ and $o$. The clutch member 27 is securely mounted on the shaft 30, and the member 28 being securely mounted on the sleeve C the two must revolve together. Under these conditions, as the gear wheel 36 is securely mounted upon the end of the shaft 30, it follows that the shaft must revolve in the same direction, and at the same speed that the drum 4 revolves, or in the reverse direction from, and much slower than the shaft 29, thus reversing the transmission.

As a shifter for operating the reversing mechanism, I have shown a divided shaft 33—33' having thereon a sleeve 17. I form two oppositely disposed angling slots 51 and 52, in this sleeve, and place corresponding pins, 53, in the shafts 33 and 33' in positions to be engaged by and slide freely in the angled slots just mentioned, so that when the sleeve 17 is made to revolve the shaft 33' will be made to move endwise a sufficient distance to carry the clutch member 28 from engagement with one of the clutch members 26 or 27 into engagement with the other of said clutch members. My means for forcing the sleeve 17 to revolve consists of an arm 19 having an annular hub thereon of a proper size to slide freely over the sleeve, and having an offset $z$ from the opening, of a proper size to slide freely over the spiral key or rib 18, so that when the arm 19 is moved the length of the sleeve 17, the latter will be made to make one half of a revolution, and will force the shaft 33' lengthwise, accordingly. The arm 19 is actuated by means of a pivotally operated arm 21 and a connecting rod 20, substantially as indicated in Figs. 1 and 2. I actuate the clutch member 28 from the shaft 33' by means of an arm consisting of a hub member 23 which is securely mounted onto the shaft 33' and has an arm extending outward therefrom, and a shifting member 25 which is pivotally connected with the hub member, as at 55. The arm of the hub member 23 should extend considerably beyond the pivotal point 55 so a plate 56 may be forced against the two by a spring, as 57, mounted on a stud, as 58, all as indicated in Figs. 16 and 17, so as to give the arm 25 sufficient lateral movement at $j$ to adjust the clutch member 28 to conditions when being transferred from one clutch member, as 26, into engagement with another clutch member, say 27, or vice versa, the plate 56 and spring 57 being designed to throw the clutch member 28 into proper engagement with the adjacent clutch member, when they are in proper relative positions for engagement.

My mechanism for throwing the transmission into permanent "fast" consists of a clutch member 35, which is slidingly mounted upon the inner end of the shaft 29, but is forced to revolve therewith by the slip key U. This clutch member is connected with the shifting clutch member 8 by means of arms 7, 7, one end of each of said arms being securely connected with the hub 6 of the member 8, and the other end of each of said arms being arranged to engage the slot $m$ in the member 35 so that any movement of the member 8 longitudinal of the shaft 29 will be transmitted to the member 35. In this construction I have shown the member 35 as having a circle of equi-spaced pins $r$, projecting outward from its back surface, and the gear wheel 36 as having corresponding holes $s$ drilled through it for the reception of said pins so that when the member 35 is forced toward the gear wheel 36, the pins $r$ are made to enter the holes $s$ and lock the said members together, temporarily connecting the shafts 29 and 30 so they will become continuous and both shafts must revolve at exactly the same speed and in the same direction.

It is not possible to bring any sudden, or over exertion upon the pins $r$ when they are being made to enter the holes in the gear wheel 36, as conditions are such that when the lever 14 is placed at $a$, both shafts, 29 and 30, must revolve at exactly the same speed and in the same direction, so that the clutch connection is made easily and naturally, and by the time real labor is thrown upon the shafts the gear wheels 44 have been so set in place against the gear teeth 38 in the drum 4 as to lock these parts together and greatly reduce the strain upon the pins $r$, necessary to carry the transmission of power to the shaft 30. This is brought about by pressure of the hub 6, of the member 8, against the lever 45, which lever is connected with the gear bearing 46, and is provided with a cam 73, by means of which the bearing Q, or R as the case may be, or, perhaps, both, is forced so firmly upon the gear wheels 44 as to lock them in place and cause them to exert a direct influence between the gear wheel 39 and the drum 4, to act directly upon the drum 4 to make it revolve directly from the shaft 29 when the transmission is thrown into direct fast motion.

To cause the clutch members 8 and 49 to stand in proper relative positions when not engaged, I pass the stems $t$ of the plates 48, through the hub 6 of the member 8, and place spiral springs $u$ upon these stems so that the plates 48 will be made to stand, normally, just flush with the, relative, right hand surface of the member 8. Normally there would be danger of the plates 48 being forced out of their chambers in the member 8 and into engagement with the clutch members 49. There are several devices that may be applied to avert this danger. In this instance I have shown the hub $v$ of the member 32, between the clutch members 49 and its bearing upon the sleeve A, as extending out far enough to engage the inner edges of the plates 48 and hold them safely in their proper positions, flush with the surface of the member 8.

I provide for operating the valves 65 of the governor, by placing gear wheels 70 upon one end of them, and operating said gear wheels by means of a slide 68, having gear teeth N, thereon, arranged to mesh with the teeth on the gear wheels 70. This slide is actuated by means of the cam 61, which is mounted on the shaft 40, and is connected with the slide 68 by means of the connecting rod 69. The connecting rod 69 is provided with a slot X, and is slidingly connected with the cam 61 by passing the end of the shaft 40 through said slot, and securing the connecting rod thereon by means of a nut S, or other available means. To actuate the rod 69, I mount an actuating roller 71 on one side of the rod 69, in position to be made to travel in the groove H, and to enter and leave said groove through the openings I and J.

I provide for shifting from "idle" into "slow", from "slow" into "fast", and vice versa, by means of a worm 9, mounted on the shaft 29, and a worm gear 10 mounted on the vertical shaft 50. The two opposite sides of the gear 10 are flattened, as at $e$, $e$, and made blank so the worm 9 may revolve freely without moving the gear 10 or otherwise affecting the shifting mechanism. The hub, 10' of the gear 10 is made flat on two sides, corresponding with the flattened sides, $e$, $e$, of the gear, as indicated in Figs. 9, 10 and 11, so the hub may be held in normal position by a spring fork 42, mounted on a laterally swinging plate 41, as at $y$. The opposite end of the plate 41 is pivotally supported upon the shaft 50 so that the bearing at $f$ will always be at the same distance from the center of said shaft, regardless of its lateral position.

The shifting arm 12 is securely mounted on the shaft 33, and is arranged to engage the slot in the periphery of the member 8, so that any longitudinal movement of the connecting rod 59—60, will move the shaft 33 longitudinally, and will cause the member 8 to slide longitudinally of the shaft 29.

The part 59 of the connecting rod 59—60, is pivotally connected with the arm 12, as at $g$, and the part 60, of said connecting rod, is pivotally connected with the upper end of the shaft 50, as at $d$, so that when the shaft 50 is made to revolve it will cause the connecting rod to move endwise and cause the arm 12, the shaft 33, and the clutch member 8 to move with it. This longitudinal movement of the shaft 33 will move the shaft 33' correspondingly and thus cause the clutch member 28 to engage with, or be disengaged from the clutch member 26 when the transmission is thrown from fast to slow, or from slow to fast, as the case may be. This averts any possible danger of the clutch members 26 and 28 being in engagement when the transmission is thrown from "slow" into "fast". It is necessary to provide some adjustment in the rod 59—60 to compensate for any movement of the member 8 after the shaft 50 has carried the connecting rod 59—60 to the extreme, relatively, left hand movement before the pins *r* have entered the holes *s* in the gear wheel 36. For this purpose I have formed a half cylinder near the adjacent ends of the parts 59—60 so that when they are placed together, as in Fig. 8, they will form a chamber 11 for the reception of a spiral spring, as 59, which is made to press heavily against the end walls of said chamber to hold the rod, normally, firmly in proper relative position. The short end of each of the parts, 59—60, has a short slot, as X, formed through it for free movement over the bolts *f* and *h*, which said bolts are screwed into the opposite part of the rod in such a manner as to hold the two parts closely together, and yet to allow them to slide longitudinally when sufficient strain is exerted to overcome the strain of the spring 59 before the pins *r* have entered the holes *s*, as hereinbefore described.

The worm gear 10 is operated to be thrown into engagement with the worm 9 by means of any available form of shifting device, as by the lever 14 which is pivotally mounted upon the table or bearing 22, and has a gear wheel 15 rigidly connected therewith. This gear wheel is made to mesh with the gear wheel 16, which latter wheel is mounted on the vertical shaft 40, which carries the cams 13 and 61. The cam 13 has an outer rim F, and an inner rim F', forming a groove G between them. This cam stands, normally, in the position indicated in Figs. 1 and 11, with the shorter end of the groove G practically under the connecting rod 60, so that the antifriction roller T, on the adjustable plate 41 will be in position in the groove G to hold the plate 41 parallel with the shaft 29, as indicated in Figs. 10 and 11. The plate 41 will retain this position until the lever 14 has been carried to the position indicated at *a*, see Fig. 1, when the cam member 13 will be made to assume the position indicated in Fig. 10 without changing the position of the plate 41. The cam 61 stands, normally, in the position indicated in Figs. 11 and 21, and holds the valve ports L—M open, as indicated in Fig. 25. When the lever 14 is carried around to *a*, see Fig. 1, the cam 61 is carried around to the position indicated in Figs. 2 and 10 and the valves 67 are made to revolve in their bearings sufficiently to close the openings or ports L—M as shown in Fig. 3 and indicated in Fig. 26, so that no oil can be forced through these ports, and the governor holds the transmission actually but temporarily in fast, as before described. When the lever 14 is carried around to the position indicated at *b*, see Fig. 1, the cam 13, and the plate 41 will be carried around to the positions indicated in Fig. 9, and the worm gear 10 will be carried into position so that its first tooth to the left of the blank space *e*, will be engaged by the worm 9, see Fig. 7, and the continuous revolving of the worm 9 will cause the worm gear 10 to revolve one half of a revolution. In the mean time the lever 14 will be carried around to the position indicated at *c*, see Fig. 1. This movement will carry the arm 12, relatively, to the left far enough to disengage the clutch members 48—49 and cause clutch member 35 to engage the clutch member 36, and at the same time the hub 6 of the clutch member 8 will be forced against the levers 45 with sufficient pressure to clamp the gear wheels 44 firmly against the surface of the arms 5, 5 to insure a strong, steady and unmovable connection for fast speed. This movement of the clutch 8 will release the gear wheel 32 so that the shaft 29 and the sleeve A may continue to revolve within the gear wheel 32 with this wheel standing idle, thus rendering the governor inoperative when the transmission is permanently in "fast". When the transmission is in this adjustment the lever 14 assumes the position indicated at *c*, and the cam 61 assumes the position indicated in Fig. 21, when the roller 71 will rest at K outside of the rim of the cam, not shown.

When it is desired to carry the transmission from permanent "fast" back into temporary "fast" or to "slow" the lever 14 is carried from *c* around to *a* and the first tooth of the worm gear 10 is engaged by the worm 9 and the wheel 10 is again made to revolve one half of a revolution and thus draws the clutch members 35—36 apart and the clutch members 8—49 are reëngaged and the governor mechanism is again made operative to reverse, or to carry the transmission into "slow" or to "idle" as desired.

With the lever 14 at *c*, the cam 61 is in the position indicated in Fig. 2. To render this transmission inoperative the lever 14 is carried around to the position indicated by the solid lines in Fig. 1 and the cam 61 assumes the position indicated in Fig. 21, with the roller 71 in the opening *j*.

When the lever 14 is carried from its normal position, see solid lines in Fig. 1, to the position indicated at *a*, the transmission is carried gradually from "idle" through "slow" and into temporary "fast" preparatory to being thrown into permanent "fast" by directly connecting the shafts 29—30 through the engagement of the clutch members 35—36. By this means I am able to wholly avert the danger of any sudden shock when changing the transmission from one speed to another, and to render the stripping of gear teeth impossible.

At any time when the transmission is in slow, or in temporary "fast" the transmission may be readily reversed without the least shock by the engagement of different gear connections, but when the shafts 29—30 are directly connected, as in permanent "fast," it will be impossible to operate the reversing mechanism.

While, as hereinbefore stated, the clutch members 35—36 are shown as having pins, as r, projecting from one member and made to engage holes s in the other member, it is to be understood that any available form of clutch mechanism may be used here, or upon any other part of the transmission where clutch mechanism is to be used.

The pin 76 in the shaft 40 is designed to engage the notch 77 in the shaft 33 when the lever 14 is being carried around to a, for the purpose of holding the lever and cams so as to avert the danger of throwing the transmission suddenly from "slow" into "permanent fast," or vice versa, being designed to compel the operator to stop at a, long enough to give the governor complete control so as to hold the transmission in "temporary fast" until the desired permanent change of speed may be attained without danger of bringing any sudden strain upon any of the working parts of the transmission.

2 and 3 represent bearings for supporting the shaft 29—30, and 22 and 24 represent like bearings for the shaft 33—33′.

An electric motor, as 74—75, a gas motor, or any other available motor may be used for operating this transmission, as with any other form of transmission.

What I claim as new, and desire to secure by Letters Patent of the United States, is:

1. In power transmission mechanism, a main shaft divided and properly connected at the adjacent ends to form a revoluble driving shaft and a revoluble driven shaft in direct alinement, an actuating lever and mechanism connected with the said shafts whereby the revolutions of the driven shaft may be increased, diminished, held uniform, reversed or discontinued while the driving shaft is revolving at uniform speed in one direction, means connected with the actuating lever whereby a gradual change of speed may be produced prior to the establishment of the speed secured by the said speed changing mechanism.

2. In power transmission mechanism, a main shaft divided and properly connected to form a driving shaft and a driven shaft in direct alinement, an actuating lever and gear mechanism, clutch mechanism, and governor mechanism connected with said shafts, and means connected therewith whereby the driven shaft may be made to revolve fast or slow, or may be reversed or discontinued from a uniform continuous revolving movement of the driving shaft, means connected with the actuating lever whereby a gradual change of speed may be produced prior to the establishment of the speed secured by the said speed changing mechanism.

3. In power transmission mechanism, a driving shaft and a driven shaft in direct alinement and having the adjacent ends revolubly connected, arms having an integral sleeve bearing revolubly mounted on the driven shaft, a drum having a shorter integral sleeve bearing revolubly mounted on the sleeve that carries the arms, internal gear teeth in said drum, a gear wheel securely mounted on the end of the driven shaft adjacent to the arms and arranged to form a clutch member, intermediate gear wheels on the arms to engage the gear wheel on the shaft and the gear teeth in the drum, arms having an integral sleeve bearing revolubly mounted on the adjacent end of the driving shaft just outside the drum, a gear wheel firmly mounted on the end of the driving shaft adjacent to these arms, intermediate gear wheels revolubly mounted on the arms in position to engage the gear wheel on the driving shaft and the gear teeth in the drum, a sliding clutch member mounted on the end of said driving shaft adjacent to the clutch member on the driven shaft, a governor indirectly connected with said shaft and mechanism, and arranged for operating said transmission mechanism to vary the speed and shifting mechanism arranged to reverse the direction of the revolutions of the driven shaft from the uniform revolutions of the driving shaft.

4. In power transmission mechanism, a main shaft divided to form a driving shaft and a driven shaft adjustably connected at adjacent ends and in direct alinement, arms, a gear wheel and a clutch member mounted on the end of the driving shaft near the adjacent end of the driven shaft, gear wheels mounted on the arms in position to mesh with the gear wheels on the shaft, a gear wheel and clutch member firmly mounted on the adjacent end of the driven shaft, arms revolubly mounted on said shaft adjacent to the clutch member, gear wheels mounted on these arms in position to mesh with the gear wheel on the shaft, a drum revolubly mounted on said shaft adjacent to the arms and having internal gear teeth projecting from its inner periphery in positions to mesh with the gear wheels on the arms on both the driving shaft and the driven shaft, a governor connected with the driving shaft, and means for operating the governor the gear mechanism and the clutches simultaneously to vary the speed of the driven shaft from the uniform speed of the driving shaft.

5. In power transmission mechanism, a main shaft divided and properly connected at the divided ends to form a driving shaft and a driven shaft in direct alinement, a permanent clutch member mounted on the end of the driven shaft, a sliding clutch member mounted on the adjacent end of the driving shaft, arms revolubly mounted on the end of the driving shaft near the clutch member and having a long sleeve bearing on said shaft, arms revolubly mounted on the end of the driven shaft adjacent to the clutch member and having a long sleeve bearing on said shaft, the permanent clutch member having gear teeth formed on the periphery, a gear wheel mounted on the driving shaft between the arms and the sliding clutch member, gear wheels mounted on both sets of arms in position to mesh with the gear wheels on the shafts, a gear drum having an integral sleeve to revolve freely on the sleeve that forms the revoluble bearing for the arms and having inwardly extending gear teeth arranged to mesh with the gear wheels on both sets of arms, a revoluble shifter slidably mounted on the arm-sleeve bearing on the driving shaft, arms connecting the shifter with the sliding clutch member, a shifting arm connected with the shifting member, a vertical shaft, a worm gear mounted on said shaft and having two opposite blank sides flattened, a worm on the driving shaft for actuating the worm gear, a longitudinally adjustable connecting rod pivotally connected at one end with the shifting lever and eccentrically connected at the other to the worm gear, governor mechanism connected with the main shaft, and means for operating the worm gear, the governor and the connecting gear and clutch mechanism to produce a variable speed of the driven shaft from a uniform speed of the driving shaft.

6. In power transmission mechanism, a main shaft divided to form a driving shaft and a driven shaft, in direct alinement, a doweled connection between the adjacent ends of said divided shaft, clutch members for temporarily locking the ends of said shafts together, connecting mechanism upon the adjacent ends of said shafts whereby the uniform revolutions of the driving shaft may produce various speeds of the driven shaft, an actuating lever and a governor connected with the main shaft, means for actuating the governor and the connecting mechanism to give various speeds and motions to the driven shaft from the uniform motion of the driving shaft, means connected with the actuating lever whereby a gradual change of speed may be produced prior to the establishment of the speed secured by the said speed changing mechanism.

7. In power transmission mechanism, a main shaft divided to form a driving shaft and a driven shaft in direct alinement with adjacent ends revolubly connected the one upon the other, mechanism connected with the adjacent ends of said shafts by means of which a uniform continuous revoluble movement of the driving shaft may be converted into different speeds, or reversed in the driven shaft, a governor indirectly connected with the driving shaft, an actuating lever and means for operating the governor and the connecting mechanism between the shafts to vary and control the speed and motion of the driven shaft, means connected with the actuating lever whereby a gradual change of speed may be produced prior to the establishment of the speed secured by the said speed changing mechanism.

8. In power transmission mechanism, a main shaft divided to form a revoluble driving shaft and a revoluble and reversible driven shaft in direct alinement, arms having a long tubular sleeve member forming a long revoluble bearing on the driving shaft, a similar arm having a long tubular sleeve member extending lengthwise of, and revoluble upon the driven shaft, a fixed spline fitted into the surface of said sleeve near the end thereof, bearings for supporting said shaft, a gear drum having an integral sleeve bearing made to revolve freely upon the arm supporting sleeve, and in the supporting bearing at this end of the shaft, said drum having gear teeth extending inward from the inner periphery of said drum, a gear wheel mounted on each of the adjacent ends of said divided shaft, gear wheels mounted on the arms to mesh with the gear wheels on the shaft and with the gear teeth in the drum, a permanent clutch member on the end of the driven shaft, a sliding clutch member on the adjacent end of the driving shaft in position to be made to engage the clutch member on the driven shaft, a sliding shifting member mounted on the arm-sleeve on the driving shaft, arms connecting the shifting member with the sliding clutch member, means for actuating said shifting member to slide the clutch member into, and out of engagement with the clutch member on the driven shaft, governor mechanism, means connected with the driving shaft for actuating the governor and the clutch mechanism to convert the uniform revoluble movement of the driving shaft into various movements and speeds in the driven shaft, a clutch member permanently anchored to the bearing that supports the driven shaft, a clutch member securely mounted on, and revoluble with the driven shaft at the end of the arm supporting sleeve on said shaft, a clutch member between the anchored clutch member and the revoluble clutch member and slidingly mounted on the end of the arm supporting sleeve over the spline key therein, an actuating arm connected with the sliding clutch member, means for rendering the free end of said arm flexible sidewise, and means for actuating said arm to throw the sliding clutch member alternately into, and out of engagement with the anchored clutch member, and with the revoluble clutch member for reversing the revolutions of the driven shaft from the continuous uniform revolutions of the driving shaft.

9. In power transmission mechanism, a supporting table, shaft bearings on said table, a shaft mounted in the bearings and divided to form a driving shaft and a driven shaft in direct alinement, a permanent clutch and a sliding clutch member mounted, respectively, on the driven shaft and the driving shaft, a shifting slide on the driving shaft, arms connecting the shifting slide with the sliding clutch member, a spiral gear wheel loosely mounted on the driving shaft, said wheel arranged to form a clutch connection with the sliding clutch member, a sliding shaft parallel with the main shaft, an arm firmly connected on the sliding shaft with its free end engaging the shifting slide on the main shaft, a vertical shaft mounted between said shafts, a worm gear mounted on said shaft and having two opposite sides flattened and left blank, the hub of said worm gear flattened on two sides, a worm on the driving shaft adapted to actuate said worm gear, a lever mounted near the sliding shaft and having a gear wheel connected therewith, a vertical cam shaft extending downwardly through the table, a gear wheel on said cam shaft in position to engage with the gear wheel on the lever, a grooved horizontal cam mounted on said shaft below the level of the main shaft and the sliding shaft, a plate pivotally mounted at one end upon the worm gear shaft, an idler mounted on said plate in position to engage the groove in the beforementioned cam, a forked spring mounted on said plate in position to engage the flattened surfaces on the worm gear hub to hold the worm gear in normal position and to carry it in engagement with the worm, a vertical shaft having a spiral gear to engage the spiral gear on the driving shaft to be made to revolve thereby, eccentrics mounted on the lower end of said shaft, a hydraulic governor having reciprocating pistons and revoluble valves therein, rods connecting the pistons with the eccentrics to actuate the pistons from the vertical shaft, a grooved horizontal cam mounted on the cam shaft below the table, geared wheels mounted on the governor valves, a toothed slide connected with the geared wheels, a connecting rod driven from the eccentric below the table to actuate the toothed slide to open and close the valves in the governor, and to regulate the action of the governor by the position of the lever, a rod pivotally connected at one end with the shifter arm and the other end pivotally connected with the worm gear to one side of the center of the gear, said rod having a chamber therein, a spring mounted in said chamber to render the rod longitudinally adjustable so arranged that the revoluble movement of the worm gear will shift the clutch members and the gear connecting members on the driving shaft and the driven shaft so as to connect and disconnect said shafts, and means for reversing the driven shaft from the constant movement of the driving shaft.

10. In power transmission mechanism, a main shaft divided and properly connected at the point of division to form a driving shaft and a driven shaft in continuous direct alinement and capable of revolving at different speeds and in different directions, gear mechanism and clutch members connected with the adjacent ends of the shafts arranged to unite the shafts to revolve in unison, or to disconnect the shafts to revolve independent of each other, a governor actuated from the driving shaft to control the speed of the driven shaft, an actuating lever, a cam shaft actuated by said lever, a sliding reversing shaft parallel with the main shaft, said shaft having a notch adjacent to the cam shaft forming shoulders therein, a pin projecting from the cam shaft in position to enter the sliding shaft and engage the shoulders thereof to partly restrain the movement of the lever when carried parallel with the shafts, and means connected with the sliding shaft for reversing the revolutions of the driven shaft.

11. In power transmission mechanism, a main shaft laterally divided to form a driving shaft and a driven shaft revolubly connected and in direct alinement, gear wheels mounted on the adjacent ends of both shafts, arms having long, tubular sleeved bearings mounted on adjacent ends of the shafts and carrying intermediate gear wheels to mesh with the gear wheels on the shafts, a gear drum having a deep annular rim projecting over the arms and provided with internal gear teeth to mesh with the intermediate gears on the arms, and a long integral tubular sleeve projecting back and revolubly mounted on the arm sleeve bearing, a proper shaft bearing, supporting each end of the main shaft, a clutch member made integral with or securely attached to the driven shaft bearing, a clutch member securely mounted on and revoluble with the driven shaft at the end of the arm carrying sleeve bearing, a spline key set in the end of this bearing between the two clutch members, a clutch member slidingly mounted on this sleeve over the spline, a divided sliding shaft at one side of and parallel with the main shaft, an arm firmly mounted on one section of said sliding shaft and extending into position to engage the sliding clutch member, a joint formed in said arm, a spring actuated plate mounted on said arm adjacent to the joint and arranged to allow for lateral movement at the end of the arm next to the sliding clutch member to provide lateral adjustment of the clutch member and final normal adjustment thereof, a revoluble sleeve mounted on the divided shaft, actuating elements connected with said sleeve for extending the shaft to actuate the sliding clutch member, and a governor, clutches and shifting mechanism connected with the main shaft and arranged to impart a variety of movements and of speed in the driven shaft from the constant revoluble movement of the main shaft, substantially as shown and described.

Signed at Grand Rapids, Michigan, September 20, 1916.

ALBERT P. CRELL.

Copies of this patent may be obtained for five cents each, by addressing the "Commissioner of Patents, Washington, D. C."